United States Patent
Damratowski et al.

[15] 3,695,621
[45] Oct. 3, 1972

[54] SHAFT SEAL FOR FLUID HANDLING MACHINE

[72] Inventors: Leonard P. Damratowski, Monroeville; Eugene L. Huesgen, Jeannette, both of Pa.

[73] Assignee: Carrier Corporation, Syracuse, N.Y.

[22] Filed: Nov. 2, 1970

[21] Appl. No.: 85,936

[52] U.S. Cl. ...................................277/75, 277/212 F
[51] Int. Cl. ..............................................F16j 15/44
[58] Field of Search..........277/22, 27, 29, 53, 67–71, 277/75, 212 F

[56] References Cited

UNITED STATES PATENTS

| | | | |
|---|---|---|---|
| 2,956,825 | 10/1960 | Hore et al. | 277/71 X |
| 1,846,598 | 2/1932 | Hodgkinson | 277/53 X |
| 3,472,519 | 10/1969 | Gehret | 277/75 X |

*Primary Examiner*—Edward J. Earls
*Attorney*—Harry G. Martin, Jr. and J. Raymond Curtin

[57] ABSTRACT

The invention relates to a sealing system for the impeller shaft of a fluid handling machine such as a compressor or turbine. A floating seal sleeve is mounted in an annular seal stator member fixed in the machine casing. The seal sleeve has limited axial and radial movement within the stator and is formed with a cylindrical portion, the bore of which has running clearance with the shaft. The surface area of the bore of the sleeve is less than the area of the outer surface of the sleeve. Seal oil under pressure flows between the seal stator and the seal sleeve and is passed through the sleeve to a groove formed in the bore of the sleeve, and also around one end of the sleeve to the shaft. The pressurized seal oil in the groove effectively blocks passage of process gas along the shaft, and by flowing over the outer diameter of the seal sleeve removes heat generated by oil shearing and maintains the seal sleeve at an acceptable temperature at high speed and pressure operation with long life expectancy.

5 Claims, 2 Drawing Figures

INVENTOR.
LEONARD P. DAMRATOWSKI
EUGENE L. HUESGEN
BY P. Emmett Thompson

ATTORNEY

SHAFT SEAL FOR FLUID HANDLING MACHINE

BACKGROUND OF THE INVENTION

One of the major problems encountered in the operation of high pressure rotating equipment is providing an effective shaft seal to prevent the leakage of process gas from the pressurized area of the equipment to an area of low pressure as for example, the atmosphere. The problem becomes more difficult as the speed of the machine is increased and with increase in pressure of the process gas.

Many seal structures have been devised but for various reasons have not been satisfactory. For example, some such seal structures permit high leakage at shutdown of the machine. Others result in excessive power loss at high speed, other simply fail after only a short period of operation. Others require a high degree of precision necessary to maintain controlled clearance, or flatness of mating parts, resulting in excessively high construction costs.

The seal structure of our invention embodies components of simple configuration whereby they are economical to produce, and are assembled in a structural arrangement which functions to provide effective sealing under all operating conditions from shutdown, to high speed and high pressure operations, and has exceptionally long life expectancy.

SUMMARY OF THE INVENTION

An annular stator member is fixed in the stationary casing of a rotating machine such as a gas compressor in concentric relation to the impeller shaft. A seal sleeve is positioned in the stator and has limited axial and radial movement therein. The inner surface of the stator is formed complemental to the shape of the seal sleeve to provide a seal oil receiving space between the stator and the sleeve. The seal sleeve and stator member are so formed that the area of the outer surface of the seal, contacted by the seal oil, exceeds the surface area of the sleeve bore wherein heat is produced, accordingly, the seal sleeve is adequately cooled.

DESCRIPTION OF THE PREFERRED EMBODIMENT

Figure 1:
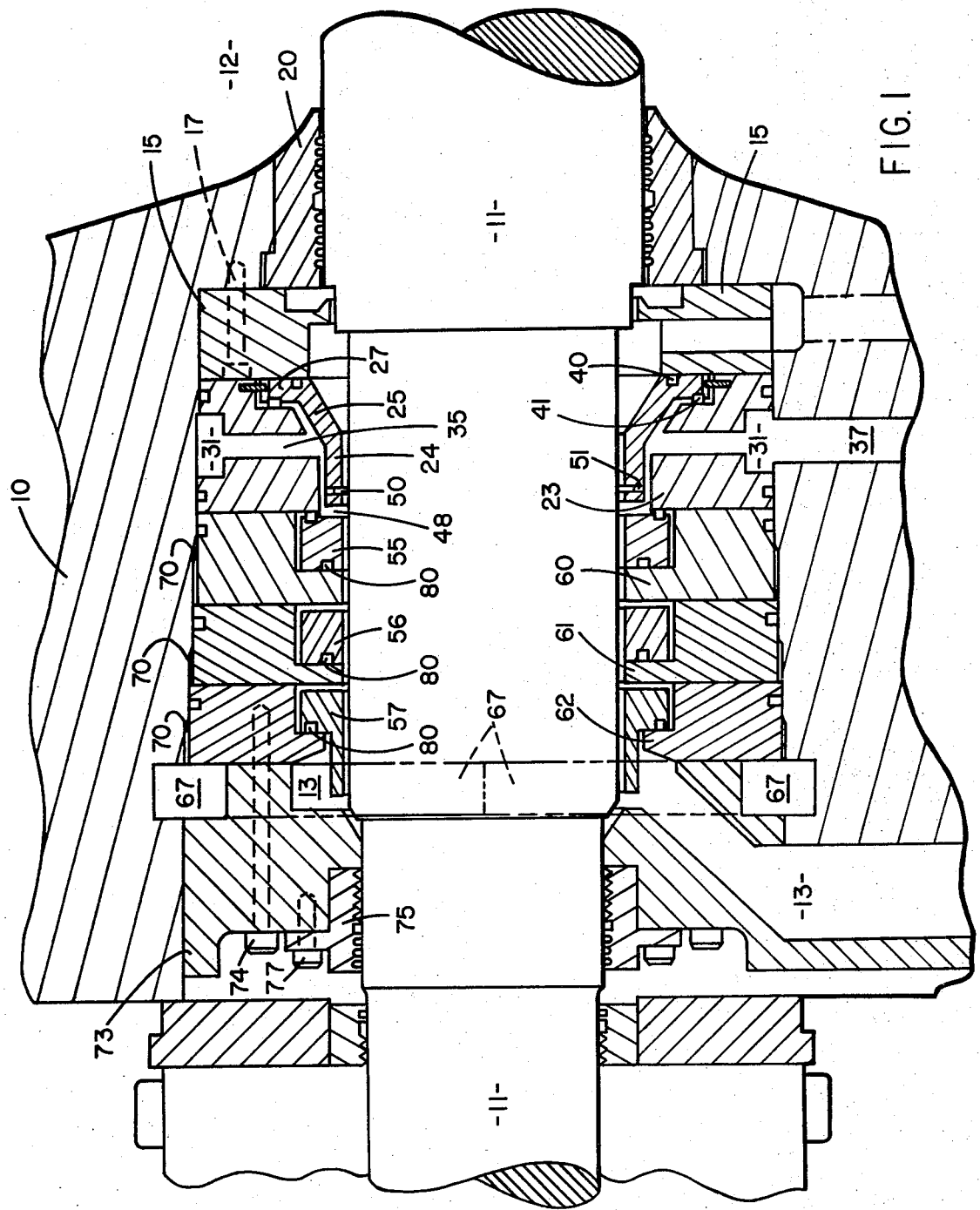
FIG. 1 is a lengthwise sectional view of a seal structure embodying our invention.
Figure 2:
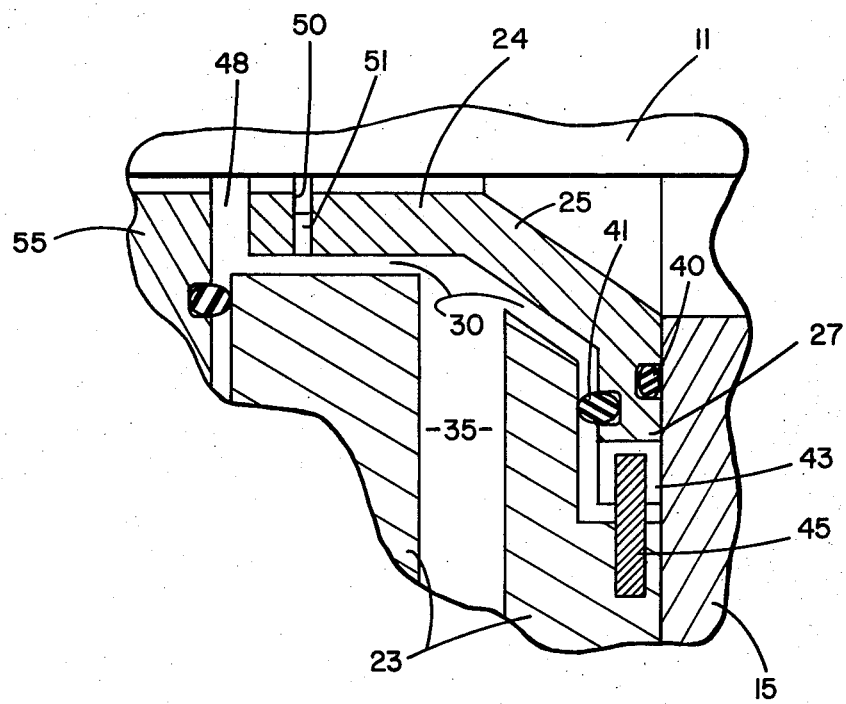
FIG. 2 is an enlarged view of the structure shown in the lower right hand portion of FIG. 1.

In FIG. 1, 10 designates the end wall structure of a typical pressurized machine casing such as a gas compressor casing. The end wall is formed with a passage through which the impeller shaft 11 extends from the high pressure area 12 at the right of the figure, to a low pressure area as indicated by the passageway 13 which conventionally extends to atmosphere, or to a seal oil collection container maintained at atmospheric pressure. The inner end wall of the passage may be formed integral with the casing 10, or by an annular member 15 fixedly attached to the casing structure 10, as by capscrews 17. If employed, the member 15 serves advantageously to position and retain a labyrinth seal member 20 encircling the shaft 11 at the high pressure area 12.

The seal structure of our invention includes an annular stator member 23 positioned in the casing passage in abutting relation to the end wall or member 15. The seal structure also includes a seal sleeve member mounted within the member 23, and being formed with a cylindrical portion 24 encircling the shaft 11 with a running clearance. The seal sleeve also includes a portion disposed in angular relation to the cylindrical portion 24 and the shaft 11. As shown in the drawings, the cylindrical portion 24 of the seal sleeve merges with a conical portion 25, which terminates in a radially disposed portion 27 abutting against the member 15.

Inner surface of the stator member 23 is formed complemental to the shape of the seal sleeve and is dimensioned to provide a space 30 encircling the sleeve, and connected to an annular groove 31, formed in the periphery of the stator 23, by radially extending passages 35. Seal oil under pressure is supplied to the circumferentially extending groove 31 by a passage 37 contacted to a source of seal oil under pressure. With this arrangement, passage 30 encircling the sleeve is supplied with a flow of seal oil. The radial flange portion 27 of the seal sleeve abutting against the member 15 has heat transfer engagement therewith. This portion 27 is also provided with an "O" ring 40 to establish sealing engagement with member 15. The flange portion 27 of the seal is also provided with an "O" ring 41 to establish sealing engagement with the stator member 23. "O" rings 40 and 41 along with seal 25 and members 15 and 23 are dimensioned to give desired preload on seal 25. One or more notches 43 are formed in the periphery of the flange portion 27 for the reception of pins 45, which serve to prevent rotation of the seal sleeve, without interfering with the floating axial and radial movement thereof in the stator 23.

The end of the cylindrical portion 24 of the sleeve, opposite the end merging with the portion 25, terminates in axially spaced relation to the opposite end of the stator 23, providing an annular path 48 in communication with the space 30 for the discharge of seal oil therefrom against the shaft 11. The bore of the cylindrical portion 24 of the sleeve is formed with a circumferentially extending groove 50 confronting the shaft 11, and having communication with the seal oil receiving space 30 by a plurality of circumferentially spaced apart, radially disposed, passages 51.

It will be noted that the conical portion 25 of the seal sleeve diverges outwardly from the shaft 11 in a direction toward the pressurized area 12. Also, the flange portion 27 is located in spaced relation to the shaft 11. With this angularly disposed structure formed by the portions 25,27, the area of the outer surface of the sleeve greatly exceeds the area of the bore surface of the cylindrical portion 24. This results in a greater outer area of the sleeve being contacted and cooled by the seal oil flowing in the space 30. The heat generated at the bore surface of the cylindrical portion 24, by the presence of the oil drag in the relatively close clearance between the bore surface and the shaft, is passed by conduction to the seal portions 25,27 and is dissipated from the outer surface of the seal portions 24,25,27 by the oil flow in the space 30. Accordingly, the seal sleeve is maintained at a satisfactory operating temperature in high speed rotating equipment of the kind described. The pressurized seal oil directed between the cylindrical portion 24 and the shaft 11 serves to block the passage of pressurized process gas which may pass from the area 12 through the labyrinth seal 20.

Preferably, breakdown seal sleeves as 55, 56, 57 are employed to provide a pressure drop of the seal oil to the seal oil drain passage 13. These floating seal sleeves are mounted in annular stator members 60,61,62 mounted in the passage formed at the end wall 10 of the casing, and disposed in axially abutting relation with each other and with the stator 23. All of these stator members are retained against axial movement in the passageway be retaining ring quadrants 67 positioned in a circumferentially extending groove in the end wall 10. The stator members 60,61,62 are restrained against rotation by keys 70.

An annular end member 73 is clamped against the ring quadrants 67 by capscrews 74 extending through the member 73 and threaded into the stator 62. An outer labyrinth seal 75 is attached to the member 73 by capscrews 77.

The floating breakdown seal sleeves 55, 56, 57 are positioned in circumferentially extending recesses formed in the stator members 60,61, and 62. The outer sides of the sleeves 55,56,57 are provided with seals 80 which are appropriately located to minimize axial loading on seals 80 as a result of pressure drop across seals 80.

The seal oil supplied to the passage 37 for flow through the space 30 is maintained at a pressure slightly above the pressure of the process gas. Accordingly, there is provided an adequate flow of seal oil through passage 48, along the shaft under the floating breakdown seals 55,56,57, to the oil discharge passage 13. However, in the absence of the oil annulus in groove 50, it has been found that shaft pumping action creates a negative pressure at the interface of 48 and 24 and 11 which may approach or equal the differential oil sealing pressure. When this occurs, the small clearance annulus between seal 24 and shaft 11 will be filled with a seal oil-gas mixture and gas can pass through the annulus between 24 and 11 to 48 and mix and be lost to the seal oil.

It is desired to maintain the oil-gas interface in the annulus between 24 and 11 to insure effective sealing. The marked effectiveness of our seal is due in large measure to the pressurized annulus of seal oil in the groove 50 located intermediate the ends of the bore in the cylindrical portion 24. The oil annulus provides a complete liquid seal which is believed to minimize shaft pumping effects on differential pressure and to to act as a barrier to gas flow due to the formation of Taylor Vortices at the oil-gas interface, thus preventing or substantially eliminating gas entrance into the seal oil flow.

We claim:

1. A rotating shaft seal for fluid handling machinery including a stationary pressurized casing, an impeller shaft journaled in said casing and extending from a pressurized area to an area of reduced pressure, comprising a gas seal structure for preventing the passage of process gas along said shaft from said pressurized area to said area of reduced pressure, said seal structure including an annular seal stator member fixedly mounted in said casing and encircling said shaft, a seal sleeve member positioned in said stator member, said sleeve member being formed with a cylindrical portion provided with a bore having running clearance with said shaft, one end of said sleeve facing toward said pressurized area, the bore of said cylindrical portion being formed in the opposite end portion of said sleeve with a circumferentially extending groove confronting said shaft, said stator member being formed to provide a seal oil receiving space encircling substantially the entire outer surface of said seal sleeve for the reception of seal oil under pressure, said space extending axially beyond said opposite end of said sleeve, said cylindrical portion of said seal sleeve being formed with radially disposed circumferentially spaced passages conveying seal oil from said space to said groove.

2. A shaft seal structure as set forth in claim 1 wherein the axial length of the cylindrical portion of said seal sleeve member is less than the total axial length thereof.

3. A shaft seal structure as set forth in claim 1 wherein the total axial length of said seal sleeve member is less than the axial length of said oil receiving space.

4. A shaft seal structure as set forth in claim 1 wherein said one end of said cylindrical portion of said seal sleeve member merges with a conical portion diverging outwardly from said shaft in a direction toward said pressurized area.

5. A shaft seal structure as set forth in claim 4 wherein said conical portion terminates in a radial flange portion having sealing engagement with said seal stator member.

* * * * *